(12) United States Patent
Ryu et al.

(10) Patent No.: US 9,462,256 B2
(45) Date of Patent: Oct. 4, 2016

(54) APPARATUS AND METHOD FOR PHOTOGRAPHING AND DISPLAYING THREE-DIMENSIONAL (3D) IMAGES USING LIGHT RECEIVING ELEMENT ARRAY THAT MEASURES LIGHT FROM VARIOUS DIRECTIONS

(75) Inventors: Hyun Surk Ryu, Suwon-si (KR); Ki Ho Kim, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 209 days.

(21) Appl. No.: 13/010,003

(22) Filed: Jan. 20, 2011

(65) Prior Publication Data

US 2011/0261161 A1 Oct. 27, 2011

(30) Foreign Application Priority Data

Apr. 23, 2010 (KR) .................. 10-2010-0037739

(51) Int. Cl.
*H04N 13/02* (2006.01)
*H04N 13/04* (2006.01)

(52) U.S. Cl.
CPC ...... *H04N 13/0257* (2013.01); *H04N 13/0207* (2013.01); *H04N 13/0217* (2013.01); *H04N 13/0402* (2013.01); *H04N 13/0422* (2013.01)

(58) Field of Classification Search
USPC ...................................... 348/46, 51
See application file for complete search history.

(56) References Cited

U.S. PATENT DOCUMENTS

| | | | |
|---|---|---|---|
| 6,362,468 B1* | 3/2002 | Murakami et al. | 250/221 |
| 2002/0054208 A1* | 5/2002 | Goldstein et al. | 348/59 |
| 2002/0196338 A1* | 12/2002 | Tham | 348/131 |
| 2004/0218234 A1 | 11/2004 | Kuroki et al. | |

FOREIGN PATENT DOCUMENTS

| | | |
|---|---|---|
| JP | 2008-040170 | 2/2008 |
| KR | 10-2003-0045706 | 6/2003 |
| KR | 10-2008-0037059 | 4/2008 |

* cited by examiner

*Primary Examiner* — Dave Czekaj
*Assistant Examiner* — Leron Beck
(74) *Attorney, Agent, or Firm* — NSIP Law

(57) ABSTRACT

A method and apparatus for shooting and displaying a three-dimensional (3D) image are provided. Light intensities and light wavelengths of light entering a single point from various directions may be measured and the process is repeated to photographing a 3D image. Light may be emitted, from each point, to corresponding directions based on the measured light intensity and the measured light wavelength measured for each direction and thus, may display a natural 3D image.

7 Claims, 7 Drawing Sheets

APPARATUS AND METHOD FOR PHOTOGRAPHING AND DISPLAYING THREE-DIMENSIONAL (3D) IMAGES USING LIGHT RECEIVING ELEMENT ARRAY THAT MEASURES LIGHT FROM VARIOUS DIRECTIONS

CROSS-REFERENCE TO RELATED APPLICATION(S)

This application claims the benefit under 35 U.S.C. §119 (a) of Korean Patent Application No. 10-2010-0037739, filed on Apr. 23, 2010, in the Korean Intellectual Property Office, the entire disclosure of which is incorporated herein by reference for all purposes.

BACKGROUND

1. Field

The following description relates to a three-dimensional (3D) image photographing and displaying apparatus and method.

2. Description of Related Art

A human brain may continuously correct an incongruity between an actual focused image and a logical three-dimensional (3D) image generated when a change in a 3D image is faster or a depth of the 3D image is deeper than the actual focused image, as is known through a 3D image technology based on a flat panel display. The 3D image technology based on the flat panel display is based on a principle different from a principle used for observing a 3D image in the real world and thus, the brain of the human may become fatigued.

A hologram is an example of photographing and displaying a 3D image. However, the hologram may use a coherent laser as a light source when obtaining an image, and may also use a laser as a light source when displaying the image. To make a 3D motion picture, it may be desirable that a variability of a medium recording the hologram be minutely changed based on a change of an image, for example 30 times per second. However, a medium having the described feature has not yet been developed.

SUMMARY

In one general aspect, there is provided a three-dimensional (3D) image shooting apparatus, the apparatus including: a plurality of light receiving element arrays positioned on a same plane or curved surface, each light receiving element including a plurality of light receiving elements, each of the plurality of light receiving elements being configured to sense a light intensity and a light wavelength of light in a predetermined direction from light entering a single point through a corresponding light receiving element array.

In the apparatus, the plurality of light receiving elements included in respective light receiving element arrays may be arranged in a shape of a trumpet.

The apparatus may further include a memory connected to the plurality of light receiving element arrays, the memory element being configured to record light intensities and light wavelengths.

In another general aspect, there is provided a three-dimensional (3D) image displaying apparatus, the apparatus including: a plurality of light emitting element arrays positioned on a same plane or curved surface, each light emitting element array including a plurality of light emitting elements, each of the plurality of light emitting elements included in respective light emitting element arrays being configured to emit light having a predetermined light intensity and a predetermined light wavelength in a predetermined direction, the plurality of light emitting elements included in respective light emitting element arrays being configured to enable imaginary lines heading in directions opposite to light emitted from the plurality of light emitting elements included in the corresponding light emitting element array to meet at a single point.

In the apparatus, the plurality of light emitting elements included in respective light emitting element arrays may be arranged in a shape of a trumpet.

The apparatus may further include a processor configured to transmit light intensities and light wavelengths recorded in a memory to the plurality of light emitting element arrays from the memory.

In another general aspect, there is provided a method of configuring a three-dimensional (3D) image shooting apparatus, the method including: arranging a plurality of light receiving elements included in a light receiving element array to enable each of the plurality of light receiving elements to sense a light intensity and a light wavelength of light in a predetermined direction from light entering a single point through the light receiving element array, and arranging, on a same plane or curved surface, at least two light receiving element arrays having the same configuration.

In the method, the arranging of the arrays may include arranging the at least two light receiving element arrays adjacent to each other.

In the method, the arranging of the plurality of light receiving elements may include arranging the plurality of light receiving elements in a corresponding light receiving element array in a shape of a trumpet.

The method may further include connecting a memory with the at least two light receiving element arrays having the same configuration, the memory recording a light intensity and a light wavelength.

In another general aspect, there is provided a method of configuring a three-dimensional (3D) image displaying apparatus, the method including: arranging a plurality of light emitting elements included in a light emitting element array to enable imaginary lines heading in directions opposite to light emitted from the plurality of light emitting elements to meet at a single point, each of the plurality of light emitting elements emitting light having a predetermined light intensity and a predetermined light wavelength in a predetermined direction, and arranging, on a same plane or curved surface, at least two light emitting element arrays having the same configuration.

In the method, the arranging of the arrays may include arranging the at least two light emitting element arrays having the same configuration adjacent to each other.

In the method, the arranging of the plurality of light emitting elements may include arranging the plurality of light emitting elements in a corresponding light emitting element array in a shape of a trumpet.

The method may further include connecting a processor with the at least two light emitting element arrays having the same configuration, the processor transmitting, from a memory, light intensities and light wavelengths recorded in the memory to the at least two light emitting element arrays having the same configuration.

Other features and aspects may be apparent from the following detailed description, the drawings, and the claims.

Figure 1:
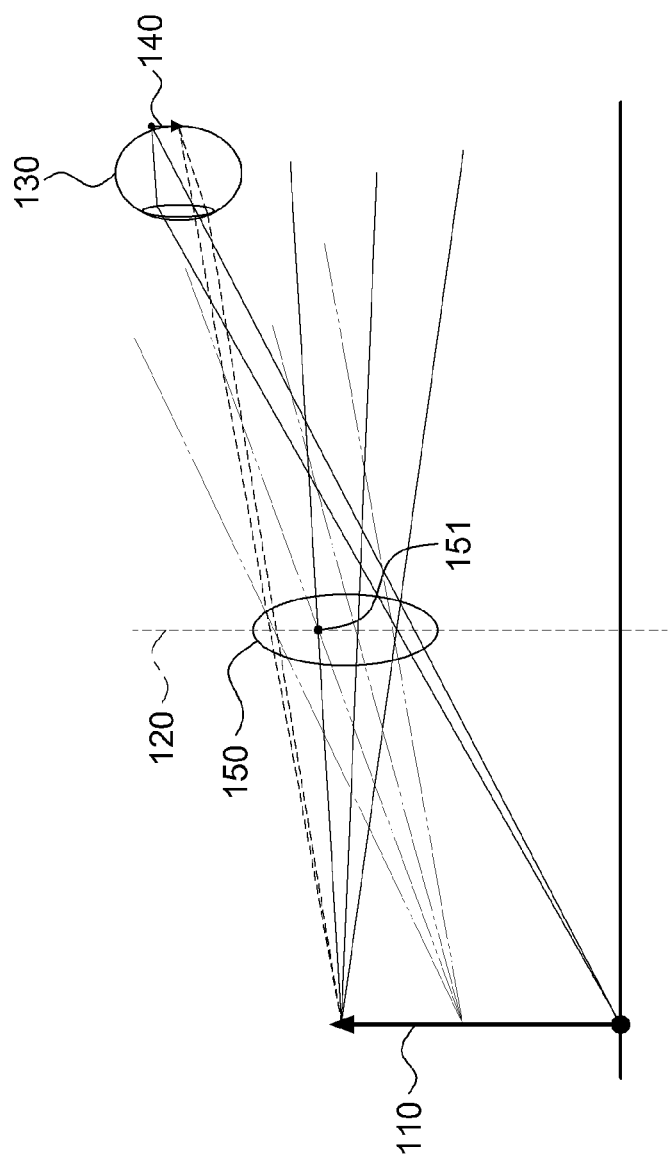
FIG. 1 is a diagram illustrating an example of a process of transferring an image of an object, from a natural world, to an eye of a human.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein may be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, descriptions of well-known functions and constructions may be omitted for increased clarity and conciseness.

A process of transferring an image from the real world may be reproduced using a three-dimensional (3D) image shooting and displaying apparatus. The 3D image shooting and displaying apparatus may record, over time, a light intensity, a light wavelength, for example, a light color, and a light direction of light entering a curved surface or a two-dimensional (2D) plane, for example, a window, in an empty space. The 3D image shooting and displaying apparatus may emit, over time, light corresponding to the recorded light intensity, the recorded light wavelength, for example, the recorded light color, and the recorded light direction. The 3D image shooting apparatus may record a light direction, a light intensity, and a light wavelength of light passing through each of a plurality of lattice points arranged, in a form of an array, on the plane or on the curved surface, and may emit light from each of the lattice points based on the recorded light direction, the recorded light intensity, and the recorded light wavelength. For example, an apparatus of recording a light direction, a light intensity, and a light wavelength of light entering a single point, and an apparatus of enabling light to proceed based on the recorded light direction, the recorded intensity, and the recorded wavelength may be included.

FIG. 1 illustrates an example of a process of transferring an image of an object, from the real world, to an eye 130 of a human.

Referring to the example in FIG. 1, light reflected or generated from an object 110 of a left side may pass through a plane 120 and may proceed to a right side. The plane 120 may be a virtual plane, for example, used for ease of description. Both light from a top of the object 110 and light from a middle of the object 110 may pass through a single point 151 of the plane 120. Light from various directions may pass through the single point 151 of the plane 120. A portion of light from the object 110 may enter the eye 130 of the human. An image 140 of the object 110 may then be formed on a retina of the eye.

The human may recognize a 3D object in the real world by recognizing a light direction and a light depth of light from an object, and thus may recognize the object in 3D. Therefore, present examples may record information of light entering a virtual plane or a virtual curved surface placed between the human and the object, and may emit light based on the recorded information.

Figure 2:
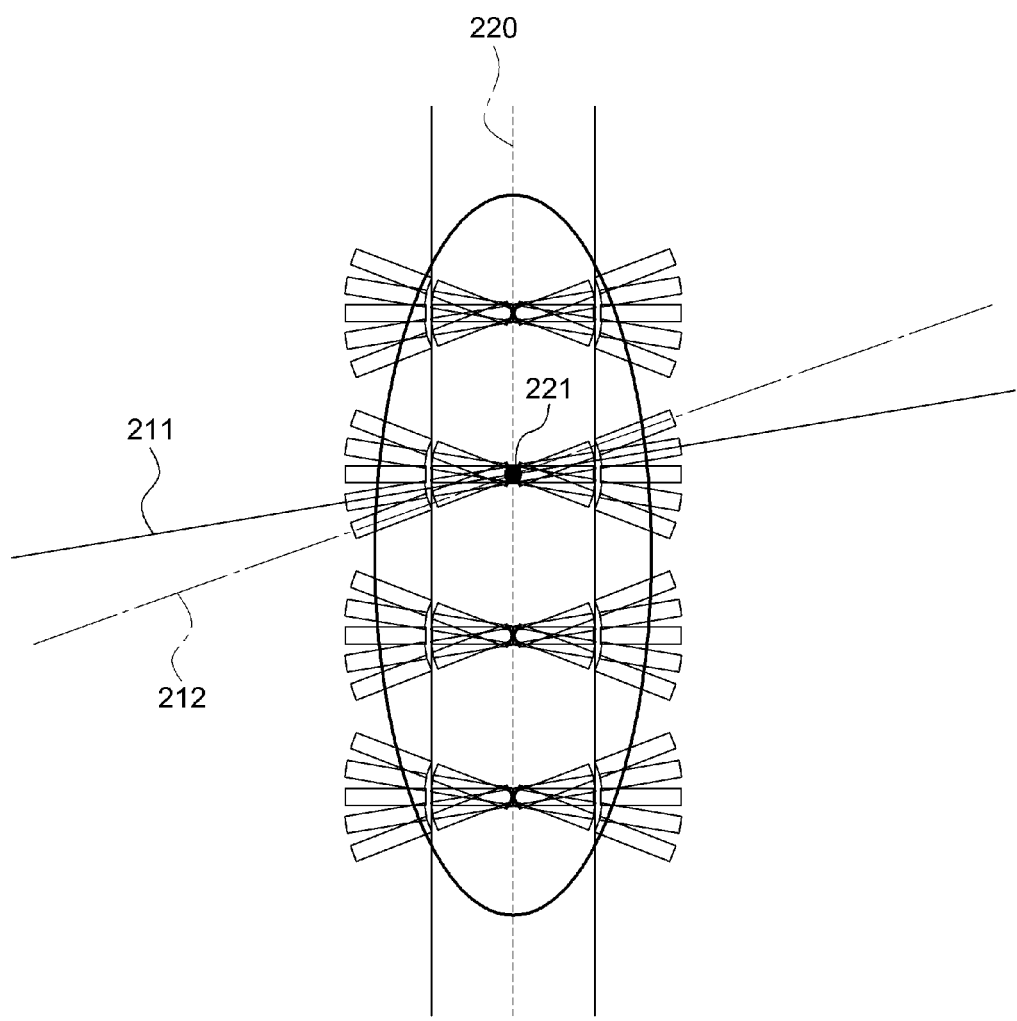
FIG. 2 is a diagram illustrating a magnified example of light passing through a plane 120 of FIG. 1.

A portion 150 of an example of the plane 120 is magnified and is illustrated in FIG. 2.

FIG. 2 illustrates a magnified example of light passing through a plane 220.

Referring to FIG. 2, a plurality of virtual lattice points exist on the plane 220. Virtual lattice points 221 may densely exist in an arbitrary location. Referring to a lattice point 221 among the lattice points, light 212 from a lower part of an object and light 211 from a middle part of the object may pass through the lattice point 221 and may proceed to a right side of the plane 220. Although not illustrated, light from different directions may also pass through the lattice point 221. That is, the directions of lights 211 and 212 are only examples of directions in which light may pass through a lattice point 221, and the directions shown in FIG. 2 are not limiting. Other lattice points may also enable light from various directions to pass-through, the light being generated from the object or from different places.

Figure 3:
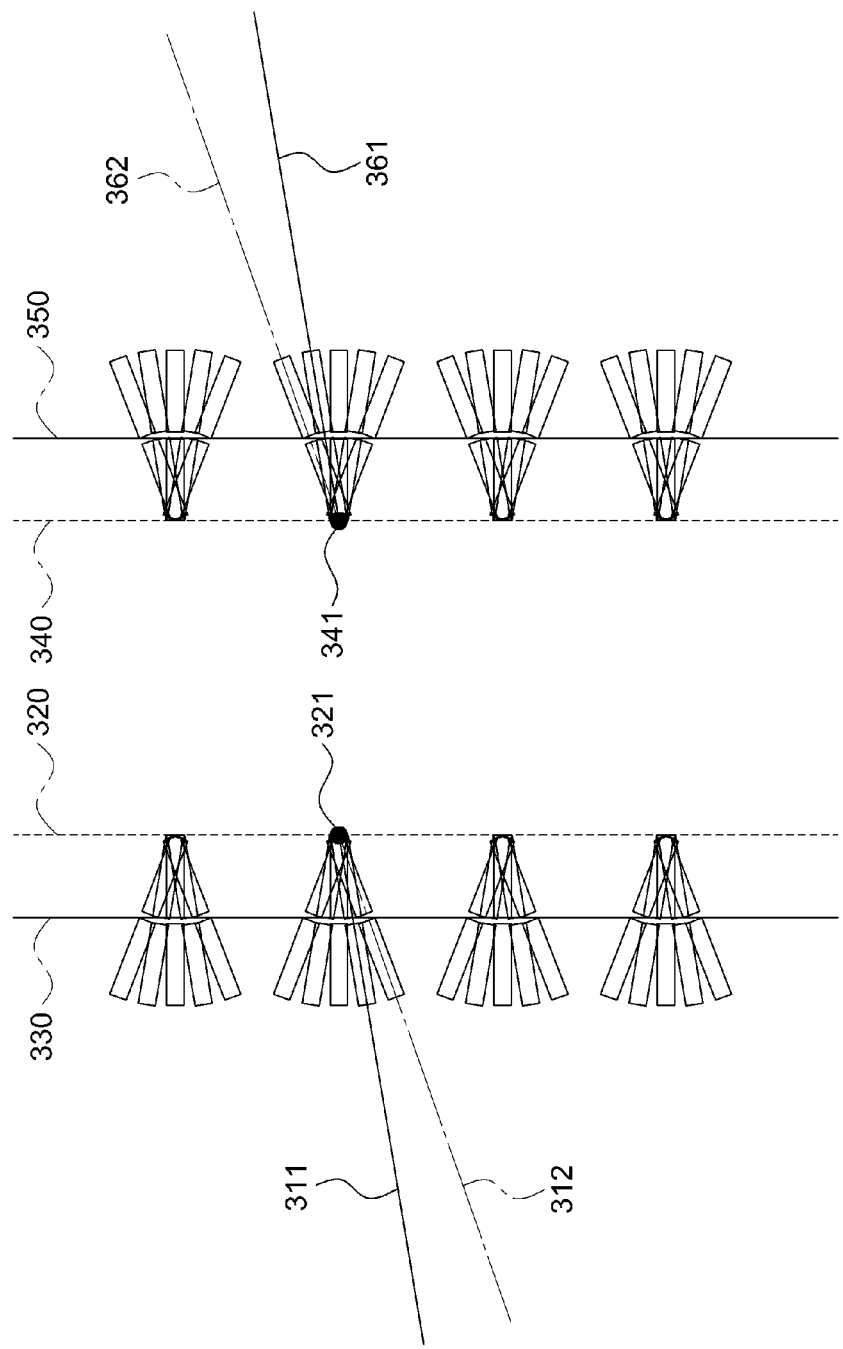
FIG. 3 is a diagram separately illustrating examples of a left side and a right side based on a plane 220 of FIG. 2.

FIG. 3 separately illustrates examples of a left side and a right side based on the plane 220 of FIG. 2.

Referring to the left side of FIG. 3 where light enters, light 311 and 312 of light from an object may pass through a single lattice point 321 on a virtual plane 320. Referring to the right side of FIG. 3 where light passing through the plane 320 is emitted, light 361 and 362 proceed to directions from a signal lattice point 341. Light 311 may correspond to light 361 passing through a plane 340 and continuing, and light 312 from different directions correspond to light 362 passing through the plane 320 and continuing, the plane 320 being the same as the plane 340, and is only separated for purposes of illustration.

A 3D image shooting apparatus may photograph, as is, light entering each of lattice points of the left side of FIG. 3, and a 3D image displaying apparatus may reproduce light emitted from each of lattices of the right side corresponding to the left side. A plane 330 is placed slightly in front of the virtual plane 320 of the left side, and the plane 330 may be a plane where the 3D image shooting apparatus measures light that is actually entering. In the same manner, a plane 350 is slightly separated from the virtual plane 340 of the right side of FIG. 3, and the plane 350 may be a plane where the 3D image displaying apparatus emits light.

Figure 4:
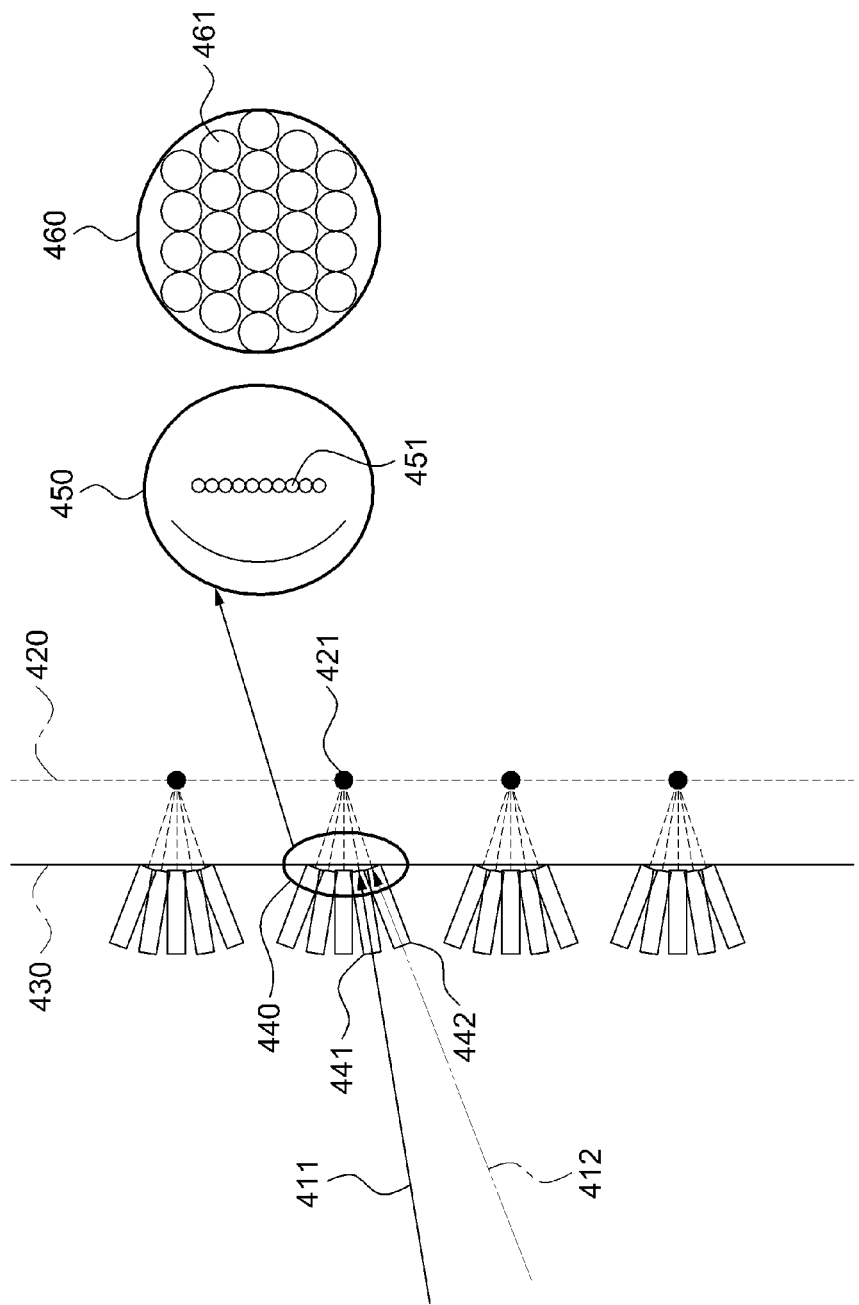
FIG. 4 is a diagram illustrating a portion of an example of a 3D image shooting apparatus.

FIG. 4 illustrates a portion of an example of a 3D image shooting apparatus.

Referring to FIG. 4, the 3D image shooting apparatus may be used for photographing, as is, a light progressing towards a left side of FIG. 3, for example, in a left side of the plane 120 of FIG. 1. The 3D image shooting apparatus may include a plurality of light receiving element arrays, such as a light receiving element array 440, existing on a predetermined plane or curved surface 430. Each of the light receiving element arrays may correspond to a lattice point. The light receiving element arrays may measure light intensities and light wavelengths or light colors of light from various directions entering corresponding lattice points.

Each of the plurality of light receiving element arrays 440 may include a plurality of light receiving elements, such as light receiving elements 441 and 442. Each of the light receiving elements 441 and 442 may measure a light intensity and a light wavelength of light in a predetermined direction from light entering a single lattice point 421 of a virtual plane or curved surface 420 through the corresponding light receiving array 440. For example, each light receiving element may correspond to a predetermined direction and may measure a light in the predetermined direction and thus, the plurality of light receiving elements may record total light entering the lattice point 421 of the virtual plane or curved surface 420.

In one example, the light receiving elements including the light receiving elements 441 and 442 may be directional light receiving elements. Each of the light receiving elements may discern light entering from a predetermined direction and may sense a light intensity and a light wavelength.

However, due to a physically limited space, the plurality of light receiving elements may not exist in the single lattice point 421 and thus, the plurality of light receiving elements may be arranged on the plane or curved surface 430 that is a slightly in front of the virtual plane or curved surface 420 including the lattice points. In one example, the light receiving elements, such as the light receiving elements 441 and 442, may be arranged in a shape of a trumpet or a bouquet of flowers, for example. Ends in one side may be focused on the lattice point 421, and ends in the other side, for example, a portion where light is received and measured, may be headed toward an object and may be arranged to be spread out, for example as in a shape of an insect eye. Therefore, as a number of light receiving elements included in a single light receiving element array increases, light in a greater number of directions may be measured or sensed.

A magnified side view 450 is side view of the light receiving element array 440. In this example, each of the light receiving elements including a light receiving element 451 may be arranged, on the same plane or curved surface 430, to be adjacent to each other.

A magnified front view 460 of the light receiving element array 440 is viewed from the object or from a direction where light is progressing. The plurality of light receiving elements including a light receiving element 461 may be densely arranged. Light receiving elements distributed on an outer portion may sense light entering the outer portion, and light receiving elements distributed on a center may sense light entering the center.

When a light receiving element array that may measure light entering a single lattice from various directions is densely arranged, on the plane or curved surface 430, to be adjacent to each other, light directions, light intensities, and light wavelengths of light entering all points included in the virtual plane or curved surface 420 may be approximately measured.

The 3D image shooting apparatus may record a light intensity and a light wavelength over time and thus, may photograph a 3D motion picture.

Figure 5:
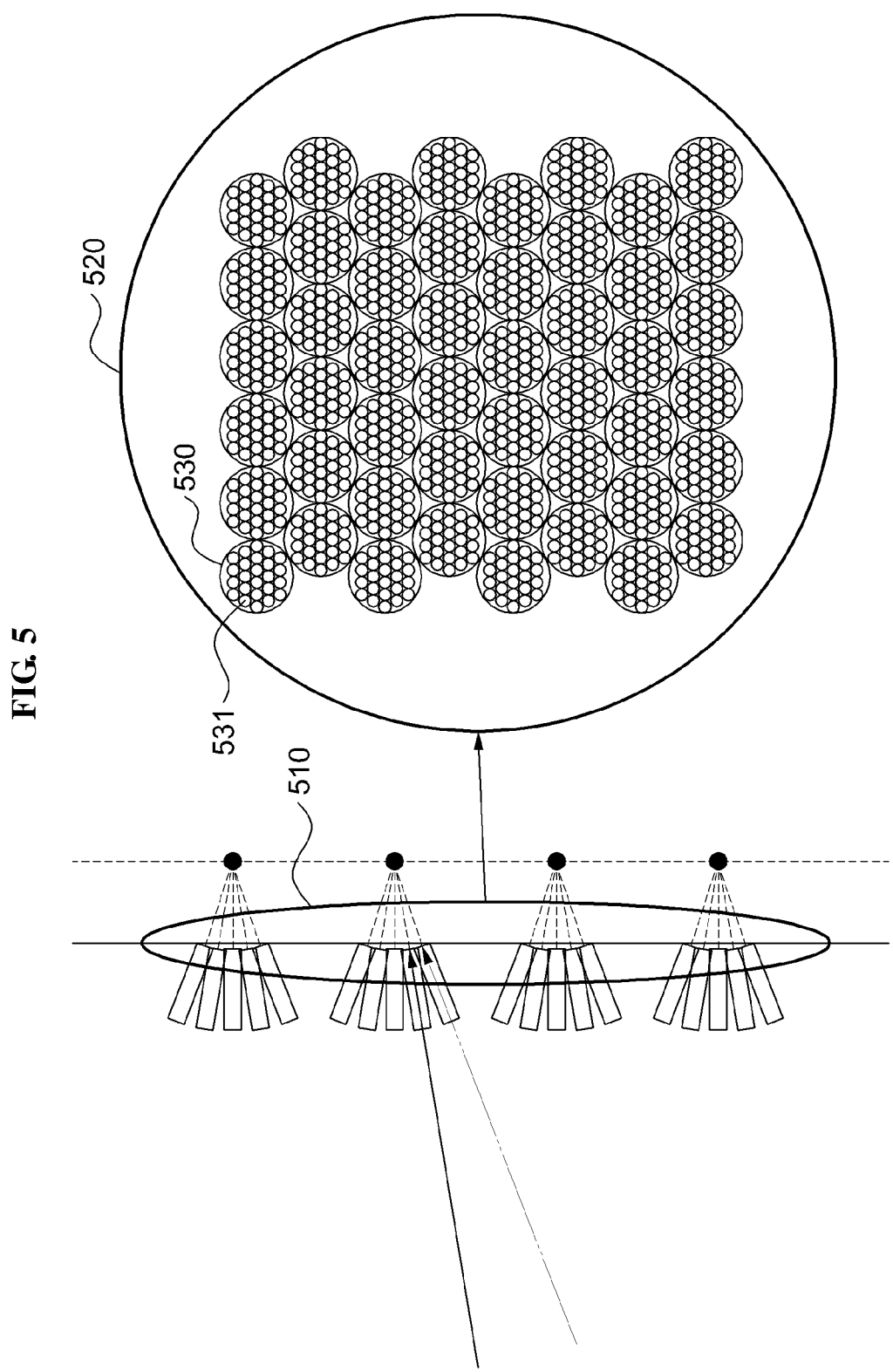
FIG. 5 is a diagram illustrating a front view of an example of a 3D image shooting apparatus.

FIG. 5 illustrates a front view of an example of a 3D image shooting apparatus according to an embodiment.

FIG. 5 illustrates a 3D image shooting apparatus similar to FIG. 4. A magnified front view 520 of a portion 510 is viewed from an object, for example, from a direction where light is progressing. A plurality of light receiving element arrays 530 may be arranged to be adjacent to each other, and each of the plurality of light receiving element arrays may include a plurality of light receiving elements 531. A light receiving element array 530 is one of a plurality of light receiving element arrays, and a light receiving element 531 is one of a plurality of light receiving elements 531. When a cross section of each light receiving element array, such as the light receiving element array 530, is in a round shape and the plurality of light receiving element arrays are arranged in a shape of a hive, empty space among the plurality of light receiving element arrays may be minimized Therefore, light entering a greater number of lattice points may be sensed. However, such a configuration is illustrated only for the purposes of example and the light receiving element arrays and light receiving elements are not limited to this configuration.

Although not illustrated in FIG. 5, the 3D image shooting apparatus may further include a memory that may be connected with each of the plurality of light receiving element arrays and may record light intensities and light wavelengths sensed by the plurality of light receiving element arrays.

Examples of the 3D image shooting apparatus are described above. A 3D image displaying apparatus may be in a symmetric structure of the 3D image shooting apparatus, and may reproduce a 3D image based on the same principles.

Figure 6:
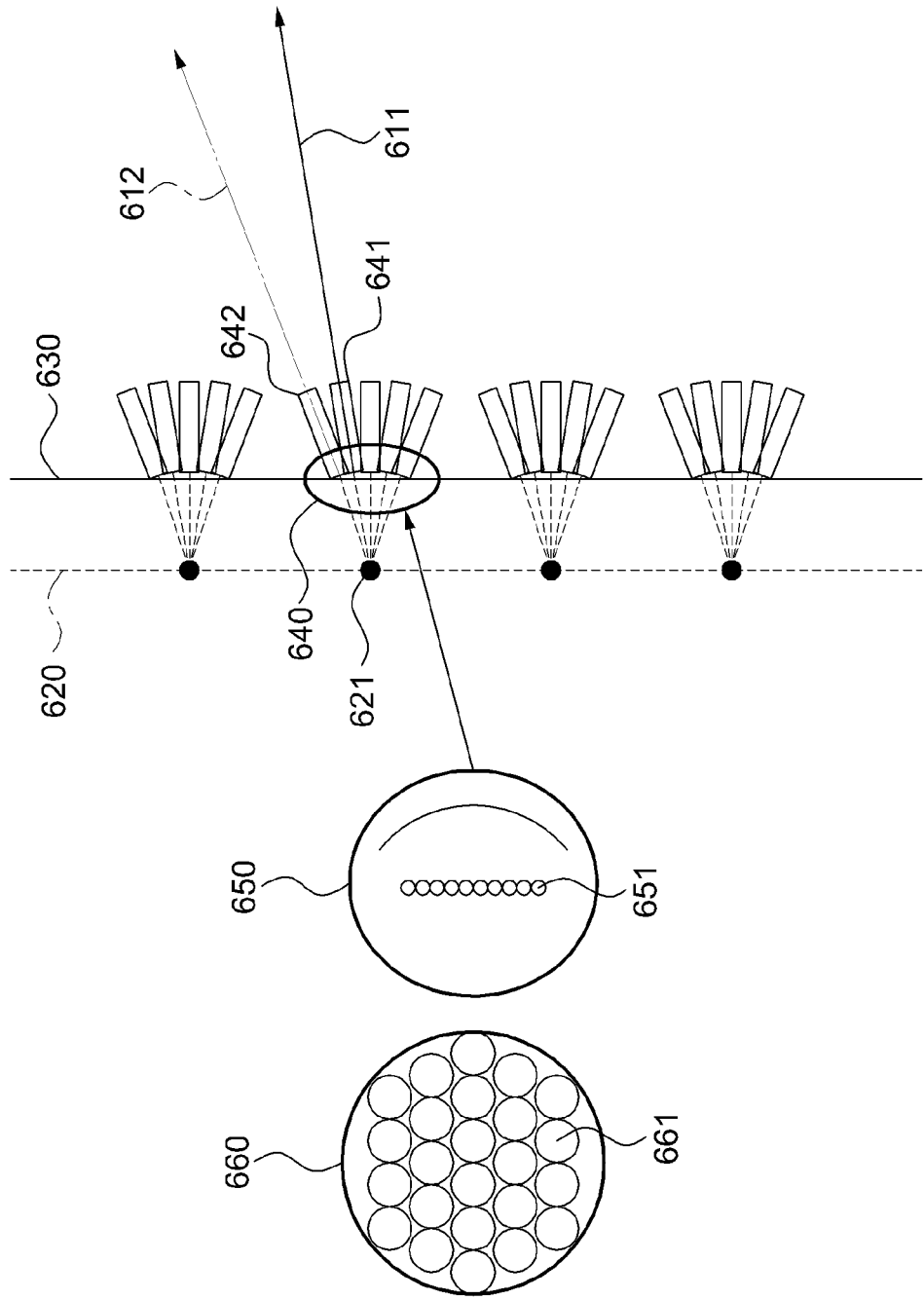
FIG. 6 is a diagram illustrating a portion of an example of a 3D image displaying apparatus.

FIG. 6 illustrates a portion of an example of a 3D image displaying apparatus.

Referring to FIG. 6, the 3D image displaying apparatus may be used for reproducing, as is, a light progressing towards a right side of FIG. 3, for example, a right side of the plane 120 of FIG. 1. The 3D image displaying apparatus may include a plurality of light emitting element arrays, such as light emitting element array 640, existing on a predetermined plane or curved surface 630. Each of the light emitting element arrays may correspond to one of lattice points, such as a lattice point 621, on a virtual plane or curved surface 620, and may emit light having predetermined intensities and predetermined wavelengths, for example, predetermined colors, in various directions. For example, the light emitting element array 640 may emit light in directions 611 and 612 from the lattice point 621 of the virtual plane or curved surface 620 in a similar manner that light is proceeding in various directions from each lattice point of a right side of FIG. 3, for example, of a right side of the plane of FIG. 1.

Each of the plurality of light emitting element arrays may include a plurality of light emitting elements, such as light emitting elements 641 and 642. Each of the light emitting elements, such as light emitting elements 641 and 642, may emit light having a predetermined light intensity and a predetermined wavelength in a predetermined direction. In this example, imaginary lines heading in directions opposite to directions of light emitted from the light emitting elements, such as light emitting elements 641 and 642, included in the corresponding light emitting array 640 may meet at the lattice point 621 corresponding to the corresponding light emitting array 640. The light emitting elements may be arranged in the corresponding light emitting element array 640 to reproduce, as is, light emitted in various directions from the lattice point 621.

In this example, the light emitting elements including the light emitting elements 641 and 642 may be directional light emitting elements. Light emitted from a light emitting element based on a predetermined light intensity and a predetermined light wavelength may proceed in a predetermined direction.

However, due to a physically limited space, the plurality of light emitting elements may not exist in the single lattice point 621 and thus, the plurality of light emitting elements may be arranged on the plane or curved surface 630 that is slightly separated from the virtual plane or curved surface 620 including the lattice points. In this example, the light emitting elements, such as the light emitting elements 641 and 642, may be arranged in a shape of a trumpet or a bouquet of flowers, for example. Ends in one side may be focused on the lattice point 621, and ends in the other side, for example, a portion where light is emitted, may be headed towards an object, such as a human eye, and may be arranged to be spread out, for example being in a shape of an insect eye. Therefore, as a number of light emitting elements included in a single light emitting element array increases, light in a greater number of directions may be emitted.

A magnified side view 650 is side view of the light emitting element array 640. In this example, the plurality of light emitting elements including a light emitting element 651 may be arranged, on the same plane or curved surface 630, to be adjacent to each other.

A magnified front view 660 of the light emitting element array 640 is viewed from a 3D image viewer. The plurality of light emitting elements including a light emitting element 661 may be densely arranged. Light emitting elements distributed on an outer portion may emit light proceeding to the outer portion, and light emitting elements distributed on a center may emit light proceeding to the center.

A predetermined light intensity and a predetermined light wavelength for each direction, which may correspond to each of the light emitting elements, may be sensed by the 3D image shooting apparatus of FIG. 4 to display a 3D image. Therefore, the 3D image display apparatus may reproduce, as is, a light passing through a window from an outside of the window. A light intensity and a light wavelength may be determined for each predetermined direction based on a principle used when the 3D image shooting apparatus performs sensing.

The 3D image displaying apparatus may emit light having different light intensities and different light wavelengths over time and thus, may display a 3D motion picture.

As the light emitting element array 640 includes a greater number of light emitting elements, such as light emitting elements 641 and 642, light in a greater number of directions may be displayed and thus, the 3D image may be more natural. As the 3D image displaying apparatus includes a greater number of light emitting element arrays in a predetermined area of the plane or curved surface 630, may emit light more similar to light actually passing through the window and thus, may display a more natural 3D image. As a size of a light emitting element or a size of a light emitting element array decreases, an effect thereof may further increase.

Figure 7:
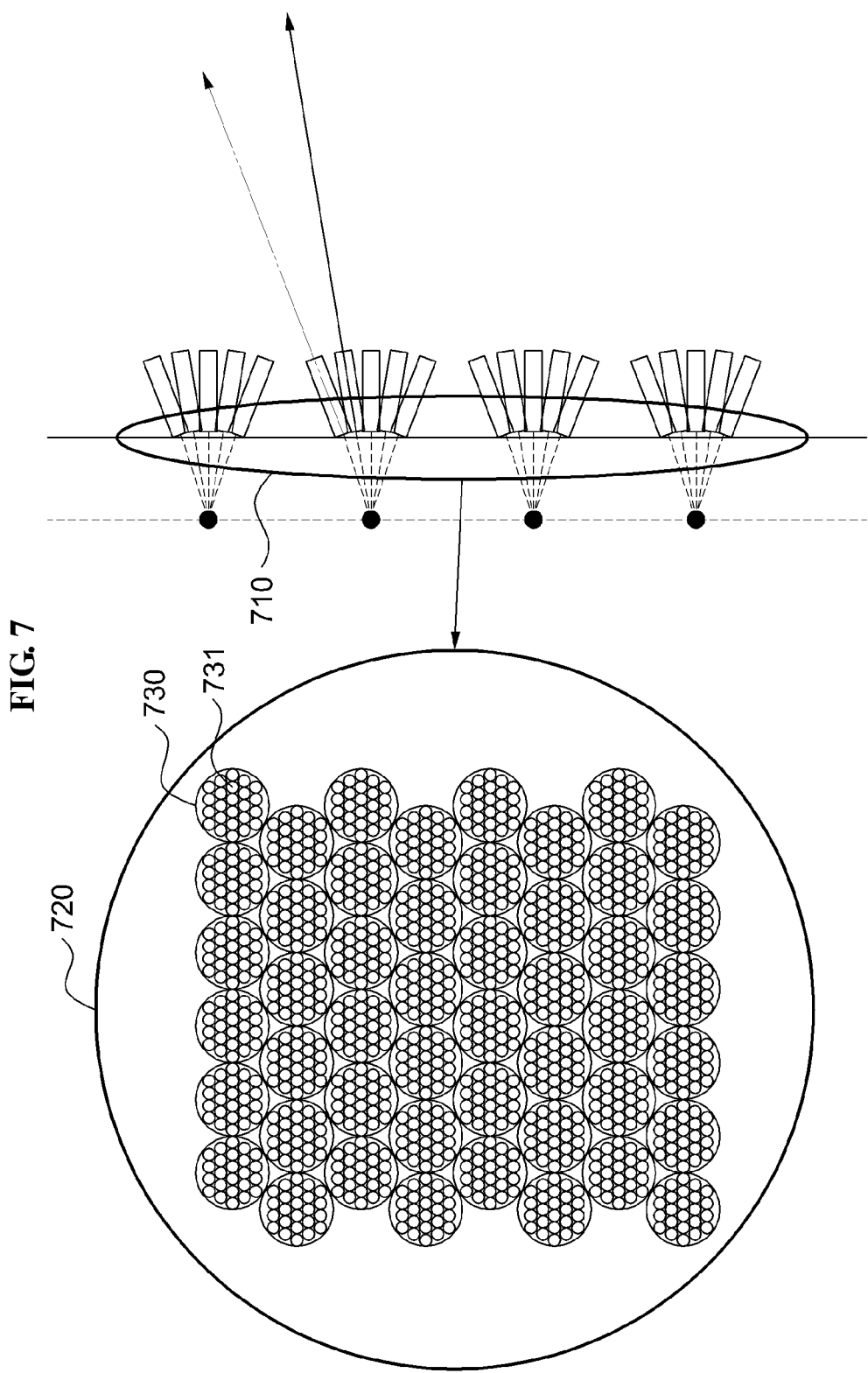
FIG. 7 is a diagram illustrating a front view of an example of a 3D image displaying apparatus.

FIG. 7 illustrates a front view of an example of a 3D image displaying apparatus.

FIG. 7 illustrates the 3D image displaying apparatus similar to FIG. 6. A magnified front view 720 of a portion 710 is viewed from a 3D image viewer. A plurality of light emitting arrays 730 may be arranged to be adjacent to each other, and each of the plurality of light emitting arrays 730 may include a plurality of light emitting elements 731. A light emitting element array 730 is one of the plurality of light emitting element arrays, and a light emitting element 731 is one of the plurality of light emitting elements. When a cross section of each light emitting element array, such as the light emitting element array 730, is in a round shape and the plurality of light emitting element arrays are arranged in a shape of a hive, empty space among the plurality of light emitting element arrays may be minimized Therefore, the 3D image displaying apparatus may display light emitting from a greater number of lattice points. However, such a configuration is illustrated only for the purposes of example and the light emitting element arrays and light emitting elements are not limited to this configuration.

Although not illustrated, the 3D image displaying apparatus may further include a processor that may transmit light intensities and light wavelengths recorded in a memory, to the plurality of light emitting element arrays from the memory.

According to the 3D image displaying apparatus, a 3D image may be viewed without using special glasses for the 3D image, such as polarized glasses and the like. Although a change of an image is faster or a depth of an image is deeper, a human brain may not suffer a burden caused by correcting any incongruity since an incongruity between an actual focused image and a logical 3D image may not be incurred. Therefore, fatigue of the human brain may be relieved, since the 3D image displaying apparatus may use the same principle as a principle used for observing a 3D object in real life A configuration method of a 3D image shooting apparatus may include arranging a plurality of light receiving elements included in a corresponding light receiving element array to enable each of the plurality of light receiving elements to sense a light intensity and a light wavelength of light in a predetermined direction from light entering a single point through the corresponding light receiving element array, and arranging, on the same plane or curved surface, the corresponding light receiving element array and at least one light receiving element array having the same configuration as the corresponding light receiving element array. In such an example, the light receiving arrays may be arranged to be adjacent to each other. The plurality of light receiving elements included in the corresponding light receiving element array may be arranged to be in a shape of a trumpet. The configuring method may further include connecting a memory with the corresponding light receiving element arrays, the memory recording a light intensity and a light wavelength.

A configuration method of a 3D image displaying apparatus may include arranging a plurality of light emitting elements included in a corresponding light emitting element array to enable imaginary lines heading in directions opposite to light emitted from the plurality of light emitting elements to meet at a single point, each of the plurality of light emitting element emitting light having a predetermined light intensity and a predetermined light wavelength in a predetermined direction, and arranging, on the same plane or curved surface, the corresponding light emitting element array and at least one light receiving element array having the same configuration as the corresponding light emitting element array. In such an example, the light emitting arrays may be arranged to be adjacent to each other. The plurality of light emitting elements included in the corresponding light emitting element array may be arranged in a form of a trumpet. The configuration method may further include connecting a processor with the light emitting element arrays, the processor transmitting, from a memory, light intensities and light wavelengths recorded in the memory to the light emitting element arrays.

Examples of a configuration method of the 3D image shooting apparatus and the configuration method of the 3D image displaying apparatus have been described. The descriptions described with reference to FIGS. 1 through 7 may be applicable to the configuration method of the 3D image shooting apparatus and the configuration method of the 3D image displaying apparatus and thus, detailed descriptions thereof may be omitted.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media such as hard disks, floppy disks, and magnetic tape; optical media such as CD-ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and method described above, or vice versa. In addition, a computer-readable storage medium may be distributed among computer systems connected through a network and computer-readable codes or program instructions may be stored and executed in a decentralized manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A three-dimensional (3D) image shooting apparatus, the apparatus comprising:
a plurality of light receiving element arrays positioned on a same plane or curved surface, each light receiving element array comprising a plurality of light receiving elements, wherein the plurality of light receiving elements included in a corresponding light receiving element array are arranged in divergent manner, each light receiving element headed toward a different predetermined direction, and configured to sense a light intensity and a light wavelength of light in directionally restricted manner to be substantially only from the predetermined direction, and light entering the plurality of light receiving elements is converged to a single point on a virtual plane located behind the plurality of light receiving elements and on an opposite side of the plurality of light receiving elements where light is received; a memory connected to the plurality of light receiving element arrays, and configured to record the light intensity and the light wavelength of light received by the plurality of light receiving elements; and, a second plane or a second curved surface comprising a light emitting array, the light emitting array comprising a plurality of light emitting elements configured to emit a second light intensity and a second wavelength of light in a second predetermined direction headed away from the light emitting array based on the light intensity and the light wavelength of light in the predetermined direction headed towards the plurality of light receiving elements.

2. The apparatus of claim 1, wherein the plurality of light receiving elements included in the corresponding light receiving element array are arranged in a shape of a trumpet.

3. The apparatus of claim 1, further comprising a processor configured to transmit light intensities and light wavelengths recorded in the memory to the light emitting element array from the memory.

4. An image processing apparatus, comprising:
a plane or a curved surface comprising a light receiving array, the light receiving array comprising a plurality of light receiving elements arranged in divergent manner, each light receiving element configured to sense a light intensity, and a light wavelength of light in directionally restricted manner to be substantially only from a different predetermined direction; a virtual plane disposed behind the plane or curved surface and on an opposite side of the light receiving array where light is received, wherein light received by the light receiving array is converged to a virtual point on the virtual plane; and a second plane or a second curved surface comprising a light emitting array, the light emitting array comprising a plurality of light emitting elements arranged in divergent manner, each light emitting element configured to emit a second light intensity and a second wavelength of light in restricted manner to be substantially only towards a respectively corresponding second predetermined direction headed away from the light emitting array based on the light intensity and the light wavelength of light in the predetermined direction headed towards the plurality of light receiving elements.

5. The image processing apparatus of claim 4, further comprising a plurality of light receiving arrays each comprising a plurality of light receiving elements, wherein light received by each of the light receiving arrays is converged to respective virtual points on the virtual plane corresponding to the respective light receiving arrays.

6. The image processing apparatus of claim 5, wherein a cross section of each light receiving element is in a round shape, and the plurality of light receiving arrays are arranged side-by-side.

7. The image processing apparatus of claim 4, wherein light from an upper portion of an object and light from a lower portion of the object are converged on a same virtual point on the virtual plane by the plurality of light receiving elements.

* * * * *